United States Patent [19]

Kumazawa

[11] Patent Number: 4,989,468
[45] Date of Patent: Feb. 5, 1991

[54] SPEED DETECTING STRUCTURE FOR VEHICLES

[75] Inventor: Toshiharu Kumazawa, Iwata, Japan

[73] Assignee: Yamaha Hatsudoki Kabushiki Kaisha, Iwata, Japan

[21] Appl. No.: 754,526

[22] Filed: Jul. 12, 1985

[30] Foreign Application Priority Data

Jul. 13, 1984 [JP] Japan .................. 59-144340

[51] Int. Cl.⁵ ............................ F16H 37/00
[52] U.S. Cl. ............................ 74/12
[58] Field of Search .............. 74/12, 325, 331, 745; 73/494, 527

[56] References Cited

U.S. PATENT DOCUMENTS

| | | | |
|---|---|---|---|
| 1,182,022 | 5/1916 | Larson | 74/12 |
| 1,436,913 | 11/1922 | Seaholm | 74/12 |
| 1,460,521 | 7/1923 | Whittington | 74/12 |
| 1,460,523 | 7/1923 | Whittington | 74/12 |
| 1,461,941 | 7/1923 | Schulze | 74/12 |
| 1,478,372 | 12/1923 | Belden | 74/12 |
| 1,486,510 | 3/1924 | Whittington | 74/12 |
| 1,499,043 | 6/1924 | White | 74/12 |
| 1,644,888 | 10/1927 | McIntyre | 74/12 |
| 1,712,955 | 5/1929 | Gustafson | 74/12 |
| 3,478,606 | 11/1969 | Pederson | 74/12 |
| 4,373,601 | 2/1983 | Onda et al. | 180/226 |
| 4,428,247 | 1/1984 | Young | 74/331 |
| 4,635,506 | 1/1987 | Imaizumi et al. | 74/745 |

FOREIGN PATENT DOCUMENTS 52515 9/1919 Sweden ..................... 74/12

Primary Examiner—Dirk Wright
Attorney, Agent, or Firm—Ernest A. Beutler

[57] ABSTRACT

A speed indicator for a vehicle transmission wherein the transmission has a driving shaft that extends through a casing of the transmission and which is adapted to drive a pair of speedometer drive gears that are detachably connected to the casing by means of a cover so as to permit changing of the speedometer drive gears to compensate for changes in the diameter of the driving wheel of the vehicle.

11 Claims, 4 Drawing Sheets

SPEED DETECTING STRUCTURE FOR VEHICLES

BACKGROUND OF THE INVENTION

This invention relates to a speed detecting structure for vehicles and more particularly to an improved and simplified arrangement for providing for speed or distance indication for off the road vehicles.

Recently, off the road vehicles of the type embodying large low pressure balloon tires have achieved considerable popularity. Such vehicles use two, three four or more wheels that are mounted with large, low pressure tires carrying pressures about 0.1 to 0.3 Kg/cm$^2$. Such vehicles have a wide variety of recreational and practical use and are, as have been noted, very popular.

In connection with such vehicles, it is desirable to provide some form of either distance and/or speed indication so that the operator can tell how fast he is traveling and also how far he has traveled. This type of vehicle normally utilizes an arrangement for powering it similar to that of a motorcycle wherein a combined engine and change speed transmission is employed as the power plant. Frequently, however, such vehicles are provided with wheels of varying diameters during their individual use and the aforenoted speed sensing or distance traveling devices have not permitted convenient adjustment or change so as to accommodate the change in the size of the tires or wheels. Furthermore, the type of drive for these sensing devices previously proposed have been rather complicated and that itself has made it difficult to adjust the speed or mileage sensing device in relation to the change in tires.

It is, therefore, a principal object of this invention to provide an improved speed detecting device for vehicles.

It is a further object of this invention to provide a speed detecting device for vehicles that may be conveniently adjusted or changed so as to accommodate for changes in the size of the driving wheels.

It is another object of this invention to provide an improved and simplified speed detecting device that may be conveniently employed in conjunction with the type of power units used for off the road vehicles.

SUMMARY OF THE INVENTION

This invention is adapted to be embodied in a speed indicator for a transmission having a casing, at least one driving shaft rotatably journaled in the casing, an output shaft rotatably journaled by the casing for driving a vehicle or the like and transmission means for driving the output shaft from the driving shaft. In accordance with the invention, the driving shaft has an end portion that extends throuth the casing and speed detecting means are driven by the driving shaft end. A cover is affixed to the casing and contains the speed detecting means.

DETAILED DESCRIPTION OF THE PREFERRED EMBODIMENT

Figure 1:
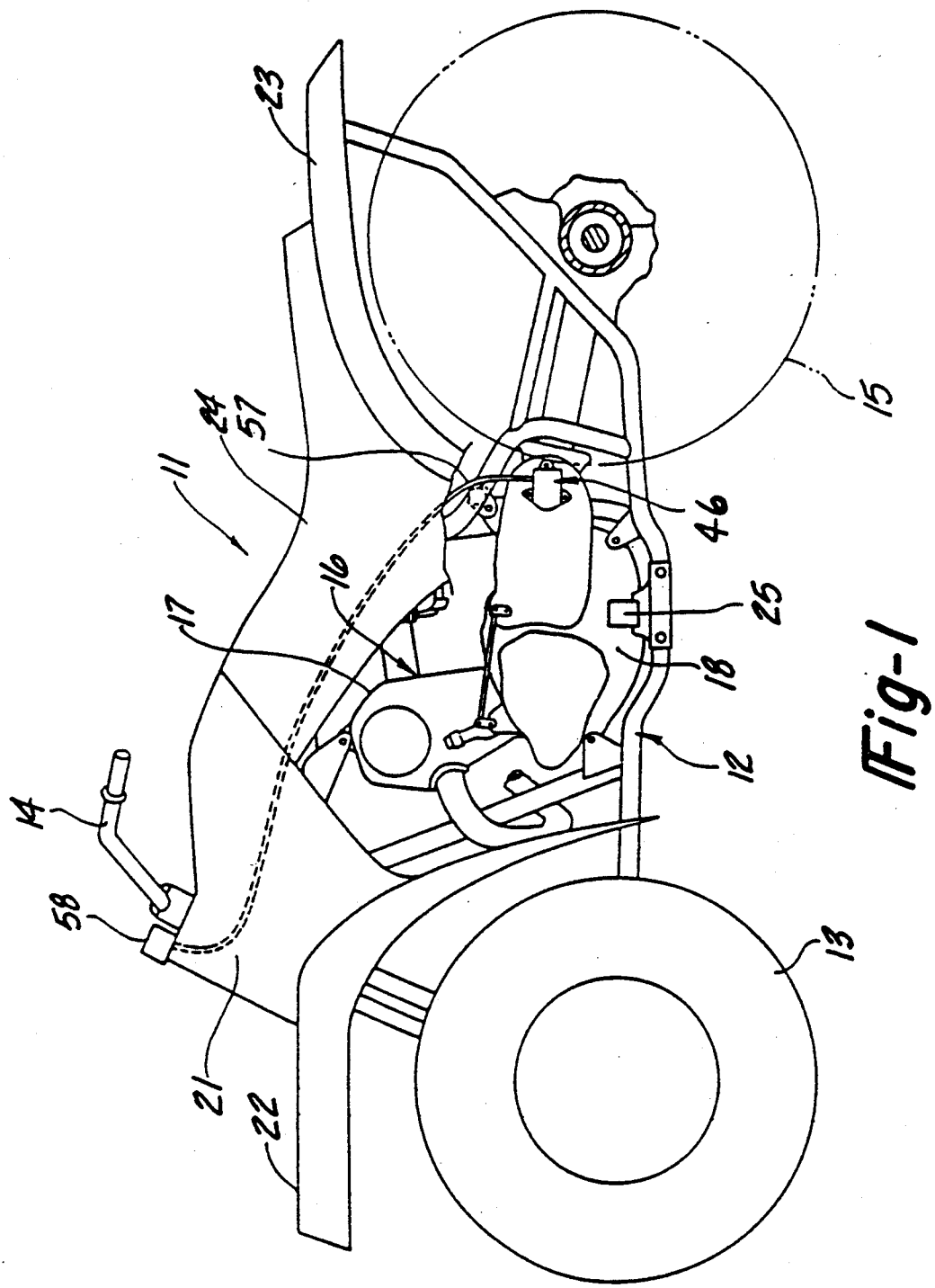
FIG. 1 is a side elevational view of an off the road vehicle constructed in accordance with an embodiment of the invention.
Figure 2:
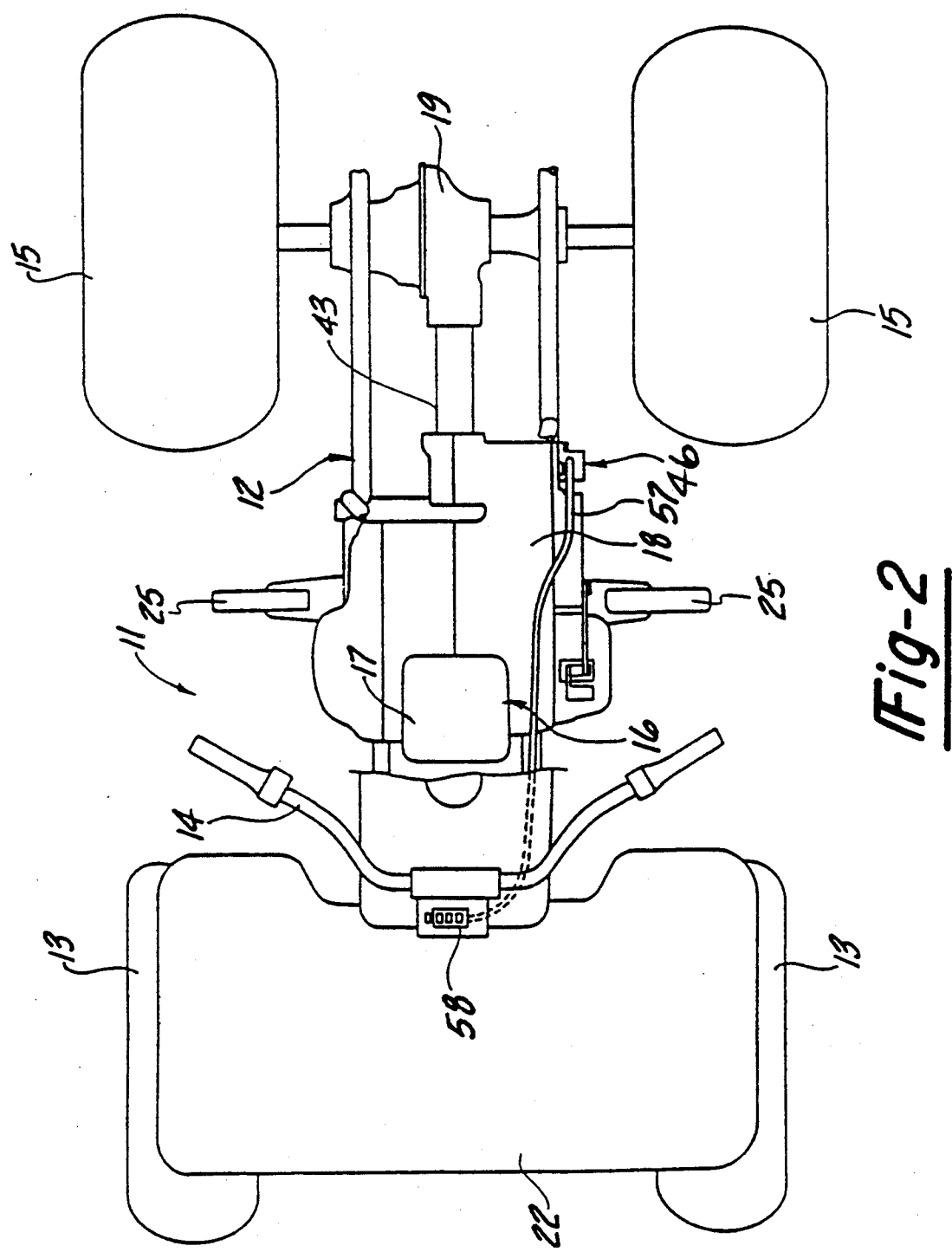
FIG. 2 is a top plan view of the vehicle, with portions removed.

Referring first to FIGS. 1 and 2, an off the road vehicle constructed in accordance with an embodiment of the invention is identified generally by the reference numeral 11. The vehicle 11 includes a frame assembly, indicated generally by the reference numeral 12 and which dirigibly supports a pair of front wheels 13 in a known manner, which front wheels mount low pressure balloon tires. The steering of the front wheels 13 is controlled by means of handlebar assembly 14 that is carried by the frame 12 in a known manner.

A pair of driven rear wheel assemblies 15 are also supported by the frame 12 and carry low pressure balloon tires. The rear wheels 15 are driven by means of combined engine transmission assembly, indicated generally by the reference numeral 16 and which is supported by the frame 12. The engine transmission assembly 16 includes a reciprocating engine 17, which in the illustrated embodiment is of the single cylinder type, and which includes a combined crankcase transmission assembly 18. The change speed transmission assembly 18 drives a shaft which, in turn, drives the rear wheels 15 through a final drive assembly 19.

A body assembly including a front cowling 21 is carried by the frame 12 and includes a front fender assembly 22 that overlies the front wheels 13. In addition, this body assembly may include a rear fender assembly 23 that overlies the rear wheels 15 and a seat 24 that is adapted to accommodate a single rider. A pair of foot pegs 25 are carried by the frame assembly 12 in proximity to the feet of the rider.

Figure 3:
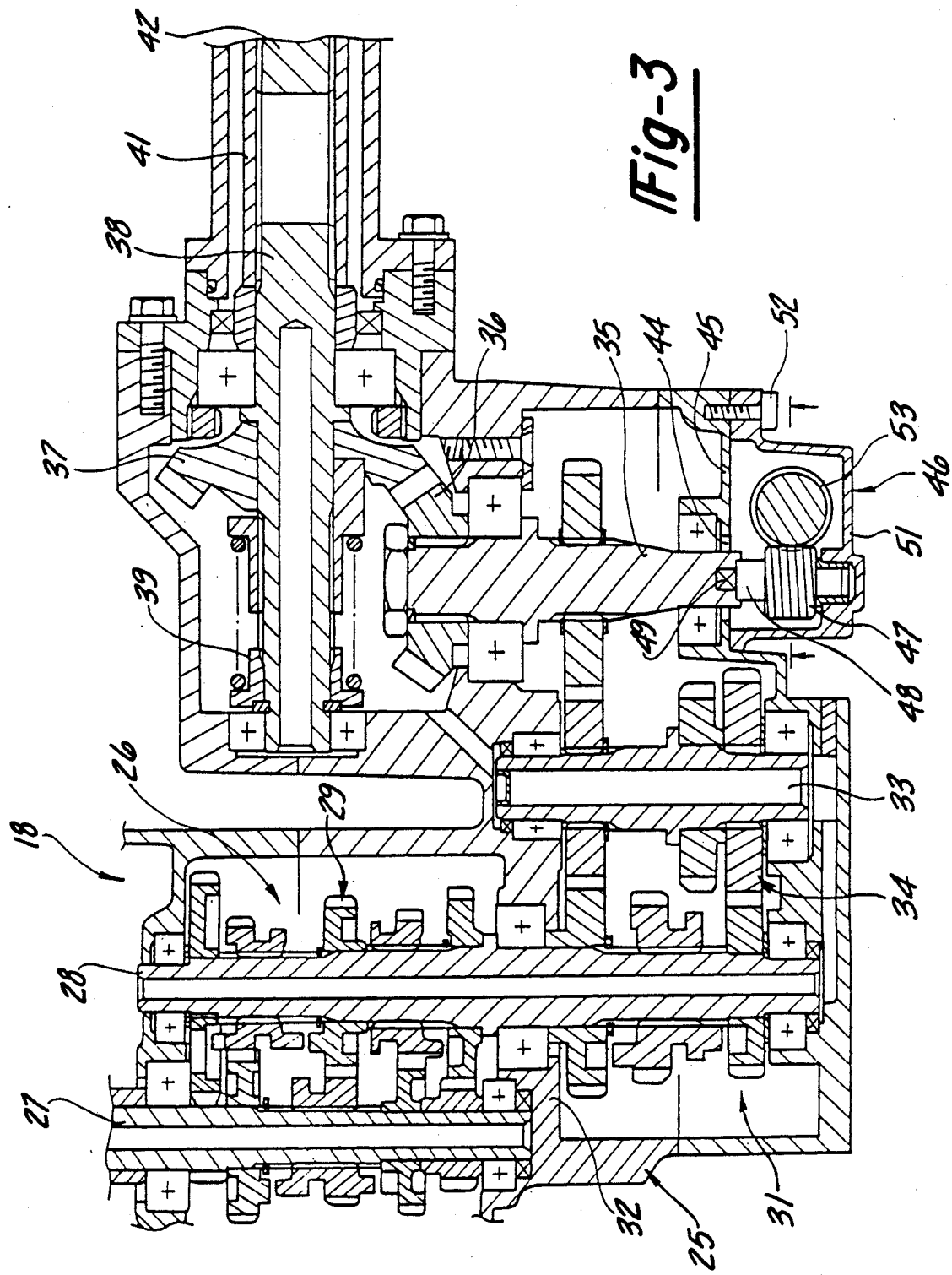
FIG. 3 is an elarged cross-sectional view showing a portion of the transmission and final drive arrangement.
Figure 4:
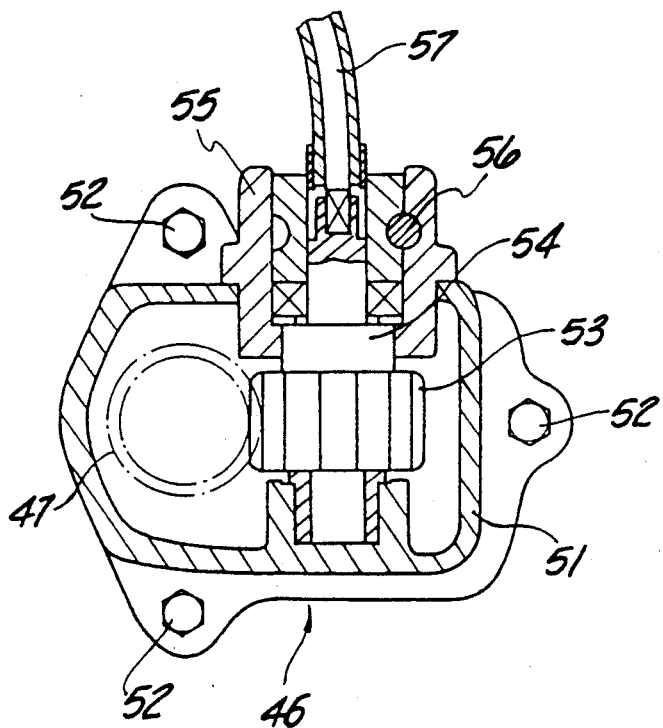
FIG. 4 is a further enlarged cross-sectional view taken along the line 4—4 of FIG. 3.

Referring now additionally to FIG. 3, the combined crankcase change speed transmission assembly 18 includes a main casing assembly, indicated generally by the reference numeral 25, in which the crankshaft of the engine 17 (not shown) in supported for rotation about an axis that extends transversely to the longitudinal axis of the vehicle 11. A primary change speed transmission, indicated generally by the reference numeral 26, is contained within this casing and includes a primary shaft 27 that is driven from the engine crankshaft by means including a clutch (not shown). A transmission secondary shaft 28 is also contained within the casing 25 and rotates about an axis parallel to the axis of the primary shaft 27 and that of the crankshaft with all of these axes extending extending transversely to the longitudinal axis of the vehicle. A plurality of change speed gears 29 are carried by the shafts 27 and 28 and are adapted to be selectively coupled to the respective shafts by means of dog clutches and a suitable shifting mechanism for selecting the speed of rotation of the secondary shaft 28 relative to that of the input shaft 27.

Also contained within the casing 25 is a secondary or auxiliary transmission mechanism, indicated generally by the reference numeral 31. The auxiliary transmission 31 is separated from the primary or main transmission 26 by means of a wall 32 of the casing assembly.

The primary transmission secondary shaft 28 extends through the wall 32 and also forms the input shaft of the secondary transmission 31. An idler shaft 33 is journaled within this same cavity and carries a plurality of gears 34 which mesh with corresponding gears carried by the extending portion of the shaft 28 for providing selected high and low speed ratios between the shaft 28 and a driven shaft 35 that is also a portion of the auxiliary transmission 31. The shafts 33 and 35 rotate about axes that extend transversely to the vehicle and parallel to the axes of the shafts 27 and 28. A dog clutching mechanism and reverse gear (not shown) is provided between the shaft 28 and the driven shaft 35 so that the driven shaft 35 may be driven at either a low, high or reverse relationship to the input shaft portion of the shaft 28. Since this shifting mechanism and transmission forms no particular part of the invention, it has not been described in any detail.

The driven shaft 35 carries a bevel gear 36 that is in mesh with a bevel gear 37 that is journaled on ano output shaft 38 which extends perpendicularly to the shafts 27, 28, 33 and 35. An overload release coupling 39 rotatably couples the driven bevel gear 37 with the output shaft 38.

The output shaft 38 is, in turn, coupled by means of a coupling 41 to a drive shaft 42 which extends through a tubular housing 43 to the final drive 19 for driving the rear wheels 15.

The auxiliary transmission driven shaft 35 has an end part that extends through an opening 44 formed in a wall 45 of the auxiliary transmission casing. A speed detecting mechanism, indicated generally by the reference numeral 46, cooperates with this extending portion of the driven shaft 35 so as to provide either or both of a speed or distance indication for the operator of the vehicle 11. For this purpose, a worm gear 47 is provided on a shaft 48 that has a splined coupling 49 with the end portion of the driving shaft 35 so that the worm gear 47 will be driven at the same speed as the driven shaft 35. The shaft 47 is journaled within a cover plate 51 which encloses the speed detecting mechanism 46 and which is non-rotatably affixed to the auxiliary transmission housing by means including bolts 52. A worm wheel 53 is in mesh with the worm gear 47 and is carried by a shaft 54 that is journaled in the cover plate 51 and a bearing 55. The bearing 55 is held against rotation by means of a pin 56 and a flexible wire 57 is rotatably coupled to the shaft 55 in a known manner. The wire 57 extends along the side of the engine transmission assembly 16 to an indicator device 58 that is positioned in proximity to the cowling 21 and just forwardly of the handlebars 14. The indicator device 58 may comprise either an odometer, a speedometer or a combination speedometer/odometer. In FIG. 1 and 2, only an odometer is illustrated.

If the size of the driven rear wheels 15 is changed, the odometer may be readily compensated by removing the bolts 52 and changing the set of gears 47 and 53 so as to provide the desired speed ratio and, accordingly, an accurate indication of distance covered or speed.

Figure 5:
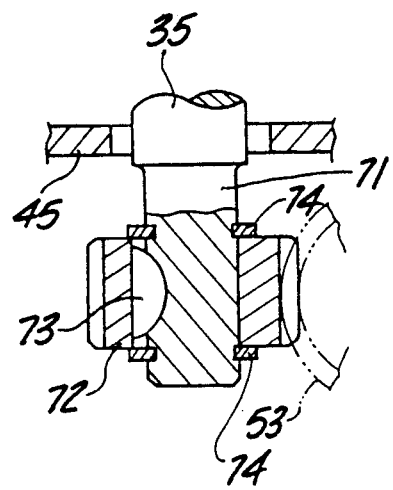
FIG. 5 is an enlarged view, in part similar to FIG. 3, showing another embodiment of the invention.

FIG. 5 shows another embodiment of the invention wherein the speed detecting drive gear is detachably and non-rotatably connected to the driven shaft 35 in a slightly different manner. In this embodiment, the shaft 35 is provided with an extension piece 71 that extends through the cover 45 and to which a worm gear 72 may be non-rotatably coupled by means of a key 73. Snap rings 74 are incorporated for affixing the worm gear 73 axially to the shaft extension 71. As with the previously described embodiment, the worm gear 73 drives a worm wheel 53 and provides the speed or distance indication in the manner as aforedescribed.

Figure 6:
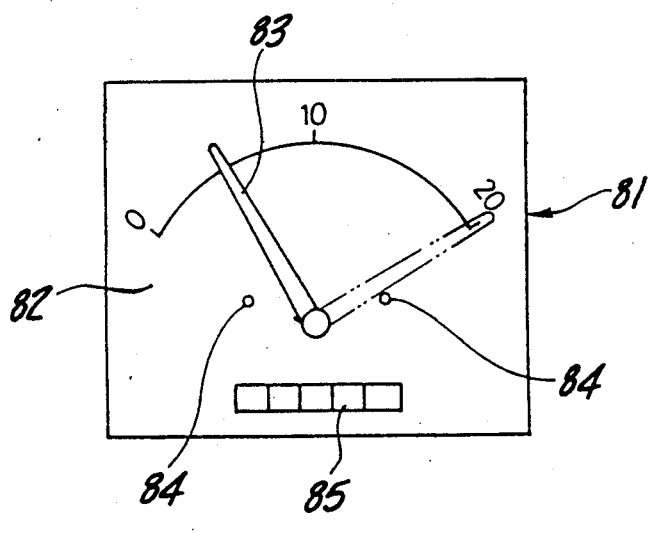
FIG. 6 is a view showing an embodiment of a speed and distance indicator.

As has been noted. FIG. 1 and 2 illustrate only a distance indiating device. As has been noted, the device can be incorporated in conjunction with a combined speedometer and odometer and such an arrangement is identified by the reference numeral 81 in FIG. 6. This device 81 includes a face plate 82 that is calibrated in suitable speed indication such as miles per hour or kilometers per hour and a speedometer needle 83 cooperates with this indication so as to provide the operator with a speed indication. A pair of stop pins 84 are provided on either side of the needle 83 so as to limit its degree of travel. An odometer 85 is also provided by the device 81 so that both speed and distance indication may be given.

When the term "speed detection" is utilized in the specification and claims hereof, it is intended to indicate a device that either detects actual speed or provides an indication of distance traveled with is, of course, equivalent to speed multiplied by time.

Although ebodiment of the invention have been illustrated and described, various changes and modifications may be made without departing from the spirit and scope of the invention, as defined by the appended claims.

I claim:

1. In a speed indicator for a transmission having a casing, said casing containing a primary transmission having a primary shaft and a secondary shaft and a plurality of change speed gears for coupling said shafts at different speed ratios and an auxiliary transmission having an input shaft consisting of said primary transmission secondary shaft and an output shaft rotatably journaled by said casing, means at one end of said output shaft of said auxiliary transmission for driving a vehicle, the improvement comprising said output shaft having an end portion at the other end thereof extending through said casing, speed detecting means driven by said output shaft end portion, and a cover affixed to said casing and containing said speed detecting means.

2. In a speed indicator as set forth in claim 1 wherein the speed detecting means comprises a pair of speedometer drive gears driving a flexible cable for driving a speedometer or odometer.

3. In a speed indicator as set forth in claim 2 wherein one of the speedometer drive gears is non-rotatably coupled to the output shaft.

4. In a speed indicator as set forth in claim 3 wherein the one speedometer drive gear is detachably coupled to the output shaft end portion through a splined connection.

5. In a speed indicator as set forth in claim 3 wherein the one speedometer drive gear has a keyed connection to the output shaft end portion.

6. In a speed indicator as set forth in claim 1 wherein the auxiliary transmission is provided within a housing separate from but affixed to a housing containing the primary transmission, said secondary transmission housing and said primary transmission housing comprising the casing.

7. In a speed indicator as set forth in claim 1 further including an engine having a crankcase, said crankcase comprising the housing of the primary transmission.

8. In a speed indicator as set forth in claim 7 wherein the speed detecting means comprises a pair of speedometer drive gears driving a flexible cable for driving a speedometer or odometer.

9. In a speed indicator as set forth in claim 8 wherein one of the speedometer drive gears is non-rotatably coupled to the output shaft.

10. In a speed indicator as set forth in claim 9 wherein the one speedometer drive gear is detachably coupled to the output shaft end through a splined connection.

11. In a speed indicator as set forth in claim 9 wherein one speedometer drive gear has a keyed connection to the output shaft end.

* * * * *